Nov. 15, 1938.    J. L. KOUBEK    2,137,055
LENS FOR ASYMMETRIC HEAD LAMPS
Filed June 3, 1936    3 Sheets-Sheet 1

Inventor
John L. Koubek
By Blackmore, Spencer & Flint
Attorneys

Inventor
John L. Koubek
By Blackmore, Spencer & Flint
Attorneys

Patented Nov. 15, 1938

2,137,055

UNITED STATES PATENT OFFICE 2,137,055

LENS FOR ASYMMETRIC HEAD LAMPS

John L. Koubek, Anderson, Ind., assignor to General Motors Corporation, Detroit, Mich., a corporation of Delaware Application June 3, 1936, Serial No. 83,186

7 Claims. (Cl. 240—41.4)

This invention relates to highway illumination for automotive vehicles and more particularly to lens structure to be utilized in headlamps therefor.

It has become general practice in roadway illumination to utilize what is termed "asymmetric" lighting which refers to the two headlamp beams of a motor car. These two beams are substantially of the same irregular shape but one is reversed with respect to the other so that as the two are superimposed certain sections of the composite pattern will be of different desired luminosities. Across the top of this composite pattern is a comparatively narrow highly illuminated portion or "hot spot", each of the headlamps contributing substantially one-half on each side with a slight overlapping in the center.

Of course, coincidental with the provision of a sufficient amount of illumination for comfortable night driving, it is also important to provide some means of dimming or lowering the projected light rays in some manner so that they will not be sent into the eyes of an approaching driver. One manner of doing this is to lower the top of the beam or "hot spot" on the left side of the composite beam pattern or road, thus leaving a dark opening into which the approaching car may proceed. In order to make this result as satisfactory as possible, substantially all of the light should be diverted from this area of the beam pattern in passing another vehicle and it is primarily with this problem and the general problem of extraneous light rays that this application is concerned.

In headlamp lens design the extraneous light caused by the characteristic of molded glass along the base of the prism or flute has always been directed in the opposite direction from the controlled light in which case if the flute or prism was in a horizontal plane the extraneous light would cross through the vision of the driver impairing vision in rain, mist or fog. If the flute or prism is in a vertical plane the extraneous light would be directed to the left of the car or road axis thereby striking the vision of the approaching driver. This is particularly true in respect to asymmetic lighting from the lamp illuminating the right hand side of the road. In view of the fact that the following disclosure deals primarily with the vertical elements, it should be pointed out and understood that the same action would be true in horizontal flutes and prisms and therefore my invention should not be limited to vertical.

The avoidance of any objectionable strong light may be accomplished in many ways such as turning the whole headlamp to the right or left, depending upon the design, and using reverse asymmetrical flutes, shallow symmetrical flutes or aiming the reflector sideways in the housing with similar flute treatment or lastly, leaving the reflector and lamp aimed straight ahead on its axis and using side bending prisms on the lens either to the left or right, depending on the design, and superimposing on the prisms either a multiplicity of shallow symmetrical flutes or reverse asymmetrical flutes.

It is therefore an object of my invention to provide an adequate illumination pattern having sharp, cut-off lines.

It is a further object of my invention to provide an adequate composite or built-up illumination pattern without glare.

It is a still further object of my invention to provide a lens covered light source which directs substantially all of the light projecting from said source into a desired area with a very small amount of stray beams.

With the above and other objects in view, which will become evident as the disclosure proceeds, my invention resides in the embodiments thereof contained in the following specification and illustrated in the accompanying drawings in which.

In any conventional motor car 2 there are provided a plurality of headlamps 4 which project two patterns which overlap to provide a composite pattern on the road surface ahead of the vehicle. The paths of the various rays are shown by the dotted and full lines in Figure 1 in which the rays forming the hot spots are shown by bracket xy and the rays forming the lower portion of the beam by wz.

Figure 1:
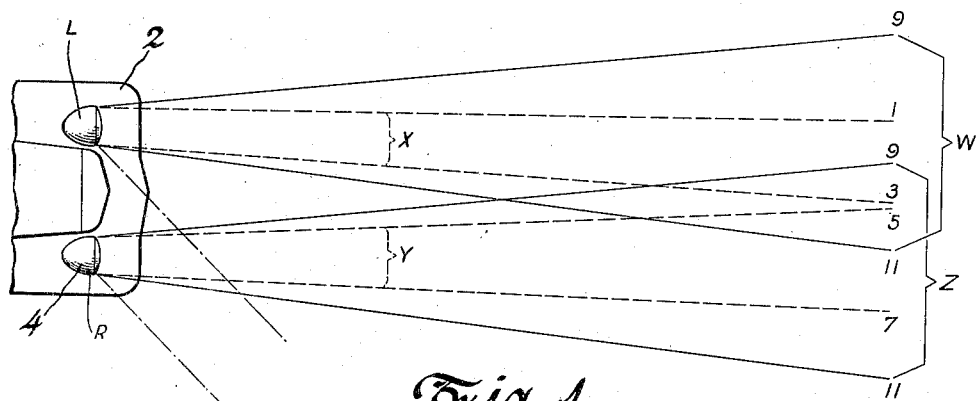
Figure 1 is a top plan view looking down upon a car, showing the paths of the beams emitting from a pair of asymmetric headlamps of conventional design.
Figure 2:
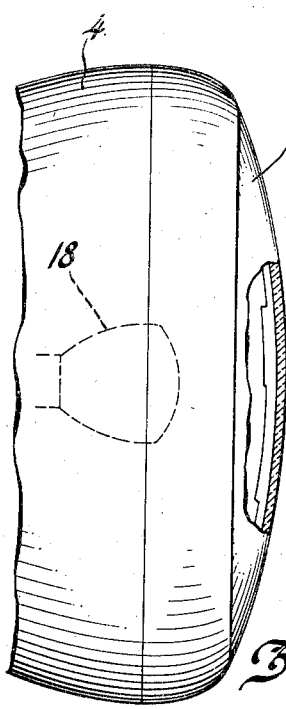
Figure 2 is a side elevation of a headlamp, parts being broken away and shown in section.
Figure 11:
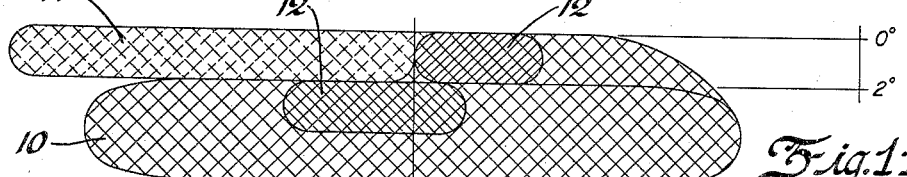
Figure 11 is a composite beam pattern from both lenses showing the passing beam.
Figure 11A:
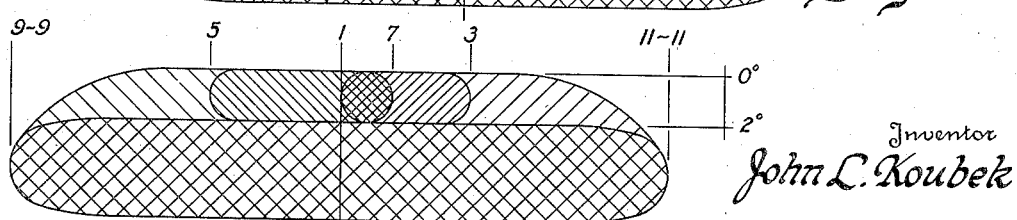
Figure 11a illustrates the composite beam pattern as formed by the two headlamps for country driving range.

Figure 11a illustrates the composite pattern formed by these rays and in order to clarify what portions of the pattern are formed by the various projected rays, the latter are numbered 1, 3, 5, 7, 9 and 11 as shown in Figure 1. The left and right hand rays of the hot spot from the left hand lens are shown by dotted lines 1 and 3 while those for the right hand lamp are shown at 5 and 7. The rays forming the left boundary of the lower portion are numbered 9 from both lamps as they are superimposed at correct driving distance and those forming the right boundary by 11. The same numerals have been applied to the beam pattern Figure 11a to show the points at which these beams impinge and to show their relative location. It is evident from this pattern that the lower portions overlap for their whole substantial area while the upper or hot spot area only slightly overlap just to one side of the center line.

Figure 4:
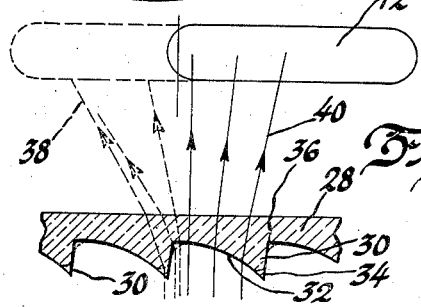
Figure 4 is a partial sectional view through a conventional lens showing the paths of the light rays therethrough to a pattern.
Figure 10:
Figure 10 is a beam pattern from a left hand lamp.

The particular beam pattern of the left hand headlight is shown in Figure 10 in which the major portion 10 is illuminated to a lower intensity than that of the area 12 which is, as before mentioned, the most highly illuminated portion or hot spot of the beam pattern. The area 14 in this design is not intended to be illuminated at all and it is only through stray rays, due to fillet light as shown in Figure 4, that this area receives any light. Of course, the beam pattern of the right hand headlamp will be of substantially the same outline but will be reversed so that the hot spot area thereof will lie partially over the area 14 shown in Figure 10. In this way the central upper zone portion of the beam is very highly illuminated and is located directly ahead of the vehicle and for proper driving. The remainer of the beam pattern illuminates the roadway between the hot spot and the vehicle and also certain area to the side of the road.

However, with the present high speeds of driving, it is necessary to illuminate the roadway at greater distances ahead of the vehicle and therefore there is more liability of light being projected into the eyes of the driver of an approaching vehicle and it is therefore necessary for purposes of safety and courtesy to provide means for the purpose of removing any rays which might be projected on the side of the road of the approaching driver and also at the same time continue to give proper illumination of the roadway directly ahead of the vehicle and to the right so that it will not be necessary to reduce the speed to any great extent or for it to be unsafe for the vehicle to proceed until the approaching car is passed.

It therefore has been the practice to lower the zone of highest intensity that falls in the upper left hand portion of the composite pattern, said hot spot zone 12' therefore assuming a position as shown in Figure 11, this zone of course being projected from the right hand headlamp.

In order for this lowering to entirely leave the area 14' black or with no illumination, which is of course the most satisfactory condition, it will be necessary to remove as much of the stray light as possible which is now the only illumination left in this zone.

Figure 12:
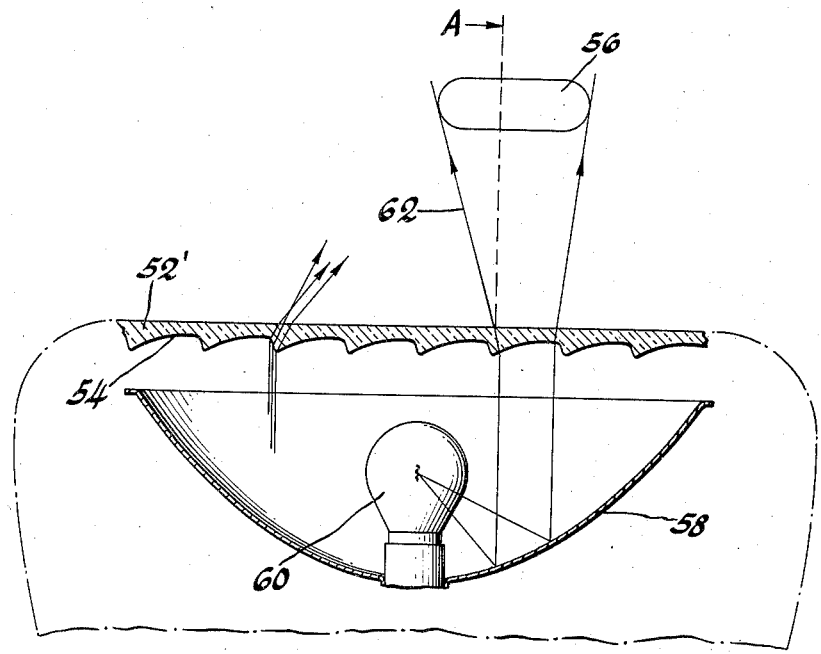
Figure 12 is a horizontal section through a left hand headlamp designed to illuminate the right hand side of the road showing a modified form whose lens has reverse flutes and showing the beam path.
Figure 13:
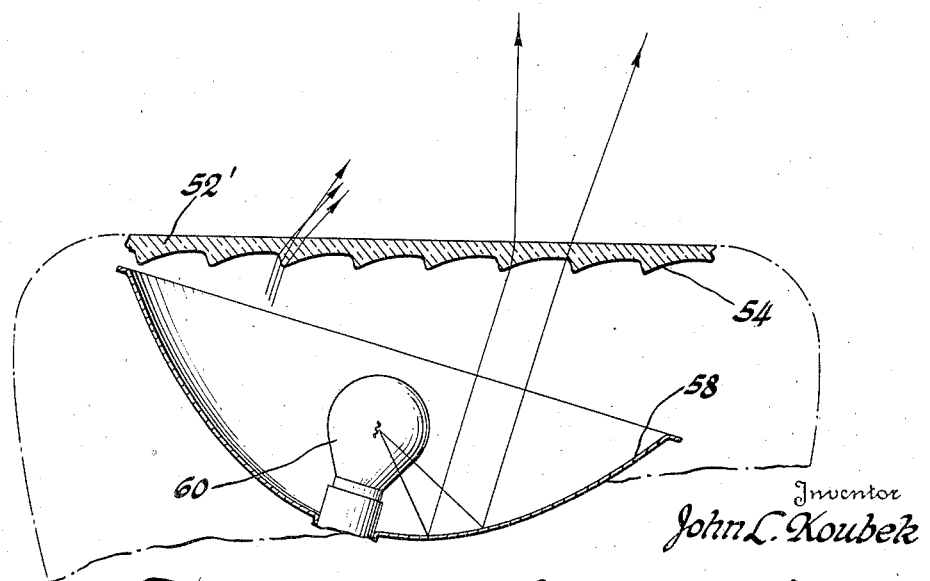
Figure 13 is a view similar to Figure 12 showing a further modification and a means for controlling the left hand cut-off of the beam pattern in Figure 12 in which the reflector is angled to the right.

As mentioned before, this may be done in several ways; by the application of reverse flutes on prisms such as shown in Figures 5–9, the use of reverse flutes and angling the whole headlamp to the right as shown in Figure 12, and the angling of the reflector with respect to the lens and maintaining the housing directed forwardly as shown in Figure 13. These various ways will now be taken up in detail in the order named.

In the headlamps 4 a lens 16 has been supported in front of a source of illumination 18 for projecting light to form the various irregular patterns as shown in Figures 10 and 11. In order to do this different zones or areas of the lens were made with different optical means thereon, these zones forming different areas of the completed pattern.

Figure 3:
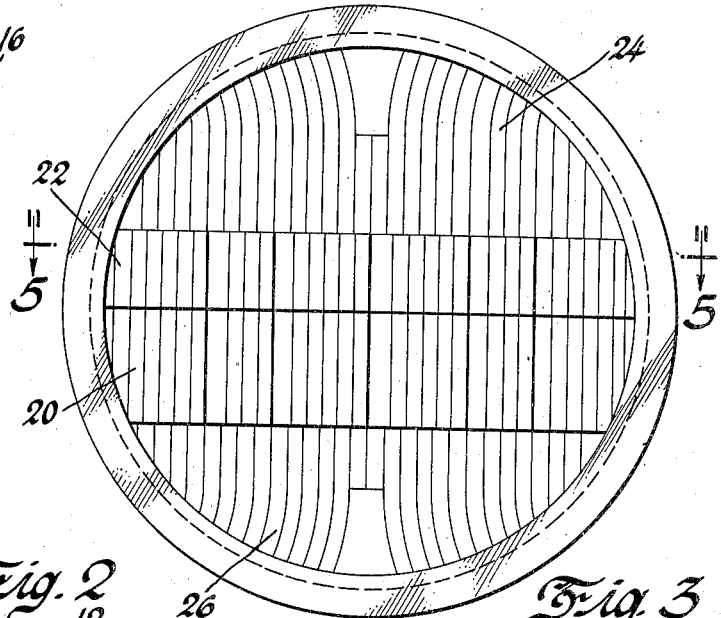
Figure 3 is an inside elevation of the surface of the lens.

This description will be confined to a left hand headlamp and, as shown in Figure 3, the two center zones 20 and 22 are utilized to form the area 12 or hot spot of the composite pattern. The outer areas 24 and 26 are, on the other hand, used to form the rest of the beam pattern which provides light for the surrounding areas. As is obvious from Figures 1 and 10, the rays from the left hand lamp are to a considerable extent bent toward the right and particularly those forming the most highly illuminated zone 12. In order to secure this result a serious of vertical prisms has been provided on one face of the lens, the base of the prisms being on the right, the action thereof being to refract and bend the light passing therethrough toward the right or toward the base of the prism. In this respect it may be noted by reference to Figure 5 that the size or inclination of the prisms in this instance is not uniform nor is there a regular graduation of the same, these being dependent on their particular relation to the reflector used and to their relative position with respect to the filament image which they receive.

Therefore, after having secured the refraction of the rays to the right, it is further necessary to spread the rays to some extent and correct for left cut-off as it is of course obvious that the illuminated area will have to be many times that of the bare reflector spot and in order to do this flutes have been provided on one face or the other of the lens to secure this dispersion. In this instance the directed light is refracted or bent further to the right than eventually necessary, necessitating the use of super-imposing smaller symmetrical or asymmetrical flutes on the prisms or opposite lens face in order to bring the light back to the proper position of lens cut off. This treatment reverses the fillet as shown in Figures 8, 12 and 13, in which case the extraneous light is directed on the same side as the directed light.

A partial section of the lens 28, shown in Figure 4, will illustrate this point in which the rear surface thereof may be considered to be a plurality of prisms 30 upon the surfaces of which are cut vertical flutes 32. In this way on one surface and in one action the light is both bent and dispersed. However, we cannot of course have sharp projecting corners such as those shown at 34 and 36 and it therefore occurs in practice, due to normal pressing characteristics of glass, that these corners are rounded, as shown by the dotted lines, at these same positions. However, when these corners are filleted, a considerable amount of light is refracted by these fillets in the wrong direction such as that shown by the dotted arrows 38, which light should of course proceed to the pattern 12 by routes similar to that shown by full line arrows 40. These stray rays therefore illuminate the section 14 which is objectionable, as before stated. Therefore, in order to overcome this difficulty, instead of placing on the rear face of the lens a series of prisms with a single flute, it is now proposed to form the rear or inner face of the lens with a series of comparatively large prisms and place on the inclined face of the prisms a series of relatively shallow symmetrical flutes whose axes are at right angles to the prism face, or asymmetric flutes with their axes angled opposite to the direction of light through the prism. In this way the fillets between the flutes will be negligible in the use of shallow symmetric or reversed in direction in case of asymmetric and in so doing the amount of stray light entering area 14′ will be reduced.

Figure 5:
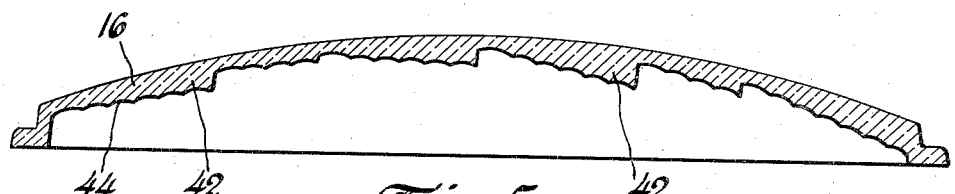
Figure 5 is a sectional view taken on line 5—5 of Figure 3 illustrating in connection with a concavo-convex lens one embodiment of the invention in which the several prisms each have superimposed thereon a series of symmetrical flutes whose axes are normal to the prism face.

As shown in Figure 5 therefore on the rear face of the lens 16 are a series of prisms 42, these prisms being of different sizes, as before mentioned, to project light from different reflector zones to its proper place in the beam pattern and cooperate with different filament images. Upon the face of each prism is provided a number of symmetric flutes 44 and it will be noted in this respect that the curvature of the fillets has been increased to a point where the extraneous light directed through them is so narrow in horizontal spread that it is contained within the directed beam. In addition the axis through the fillet is angled in the same direction as the light passing through the prism.

Figure 6:
Figure 6 is a sectional view similar to Figure 5 and shows a flat lens also provided with prisms but in this case the superimposed flutes are asymmetrical and have their axes extending at an acute angle to the prism face.
Figure 8:
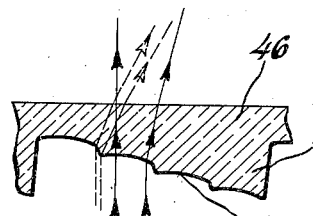

Figure 6 shows the application of an asymmetric flute to a flat lens 46 on the rear face of which are provided a series of prisms 48 having on their long flat surfaces a series of flutes 50 which flutes while asymmetric are angled opposite to the angle of the directed light of the prism and therefore show up to a different degree to that shown on the lens 16 in that the fillets are located in such a manner as to direct the extraneous light in the same direction as the directed light, as illustrated in Figure 8, their action being to bend the light rays back to form a sharp left cut-off.

Figure 7:
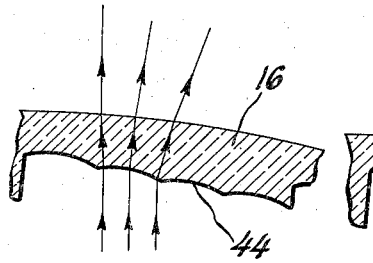
Figures 7 and 8 are enlarged views of portions of the lenses shown in Figures 5 and 6, respectively, and illustrate the direction of light rays therethrough.
Figure 9:
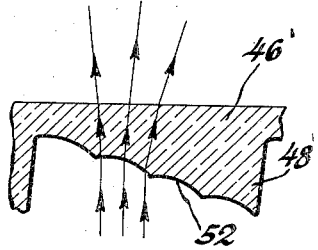
Figure 9 illustrates the application of the Figure 7 type of fluting to prisms on a flat lens.

Either the symmetrical flutes of Figure 7 or the asymmetrical flutes of Figure 8 may be applied to a given type of lens whether it be flat or concavo-convex. For example, Figure 9 shows symmetrical flutes 52 on the prism 48′ of a flat lens 46′. Thus the application of flutes in Figure 9 is the same as that of Figure 7, the prism angles being selected to take care of differences in light transmitting characteristics of flat and curved lenses. In other words, whether the lens in general is curved or flat has nothing to do with the problem of eliminating undesirable stray rays.

Figures 7, 8 and 9 show the paths of the rays through the various forms shown in lenses 16, 46 and 46′. It should be noted that there is no light sent out to the left which light would illuminate the area 14 and cause illumination which would interfere with the vision of the approaching driver. Of course, it is evident that while most of the discussion in this application is applicable to left hand headlamp lenses, that all that would be necessary in a right hand lens would be a reversal of the prisms to direct the light in the other direction or it would be within the scope of this invention to utilize this principle in other type headlamps.

In the design as illustrated in Figure 12, a lens 52′ has a series of reverse flutes 54 on the rear face thereof. By reverse flutes is meant a flute which bends or directs the light rays in the opposite direction from that normally desired to send the light. In Figure 12 the light from this lamp lies on both sides of but principally to the right of the broken line A which extends in a direction normal to the plane of the lens and parallel to the axis of the reflector. But since, as before mentioned, the stray light is sent out from the fillets in the opposite direction from the controlled or main light, the flutes are reversed to send the stray light to the right of the line A where it will not be objectionable. It will be obvious that a proper disposition of the lamp will not be one wherein the line A is parallel to the longitudinal center line of the vehicle because the main light is too far to the left as shown by the beam pattern 56 and in order to obtain the correct beam placement it is necessary to rotate the whole headlamp to the right to make ray 62 lie parallel to the vehicle center line. The usual reflector 58 and light source 60 are utilized with the lens and in this case it should be noted that the axis of the reflector is at right angles to the plane of the lens.

The angling of the headlamp to correct for the refraction to the lens is in some cases noticeable and is not desired from an appearance standpoint. Therefore, the same result may be accomplished by the arrangement shown in Figure 13 in which the headlamp housing is retained directed straight ahead and the reflector is angled with respect to the lens. This moves the beam to the right in the same manner as by angling the whole headlamp housing.

It will therefore be evident that I have provided various means for reducing light to the left of the vehicle center line in the left hand lens or vice versa, said light originally caused by draft angles or fillets of the flutes. In this case also the maximum intensity of the hot spot or highest intensity area may be brought closer to the vehicle center line due to the contraction of prism action by the fillets. It should also be clearly understood that while this description has dealt with vertical flutes that the same would apply to horizontal flutes to prevent stray light from being sent upward to impair vision in fog in such lens as are used in fog lamps.

I claim:

1. In a light modifying device, a member through which light passes, a plurality of vertical prisms on one face of the member to direct the light horizontally to one side, a plurality of vertical light spreading flutes superimposed on each prism and extending parallel to the vertically disposed prism for spreading the light horizontally, the axes of the flutes being at right angles to the face of the prisms.

2. In a light modifying device, a member through which light passes, a plurality of prisms on one face of the member, a plurality of flutes superimposed on each prism, said flutes being asymmetric with respect to the prism face, the axes of said flutes forming an acute angle with the face of the prism to direct the light in the opposite direction from the refraction of the prism.

3. In a headlamp for forming a composite beam pattern made up of different sections of varying luminosity, a lens, zones on the lens, each adapted to supply a part of the complete beam pattern, a plurality of prisms on at least one of the center zones to direct the light to one side, a plurality of flutes on each prism to spread the light to form a large pattern, said flutes being substantially identical to each other and of uniform width throughout and extending in parallel relation following the direction of the prism, and end zones to form the remainder of the composite pattern.

4. In an asymmetric headlighting system, a lens for directing light rays to form a given beam pattern, said lens including throughout the width thereof a horizontal succession of vertically disposed light deflecting prisms, all of the prisms being arranged to bend light to one and the same side and each prism having on the face thereof a plurality of vertically disposed and correspondingly shaped light diffusing flutes.

5. In an asymmetric headlighting system, a pair of lamps cooperating with one another to form a beam pattern, means to substantially eliminate extraneous light in the upper left quadrant of the beam pattern including a lens for the left lamp having a succession of side bending prisms therein and each prism having parallel thereto a succession of relatively shallow flutes, said flutes being so shaped and arranged for cooperation with each other and with the successive base portions of the prisms as to minimize fillet light dispersion.

6. In an asymmetric headlighting system, a pair of cooperating lamps adapted to form composite beam patterns having overlapping high intensity portions, both lamps including lenses having beam direction controlling formations arranged in groups, the group of formations in the left-hand lens which results in the high intensity portion of the beam pattern comprising a series of right-hand bending prisms and a series of vertical similarly shaped shallow flutes on the face of each prism.

7. In an asymmetric headlighting system, a lens having formations thereon arranged in zones to give a predetermined beam pattern having a hot spot therein, the zone of formations giving said hot spot comprising a horizontal succession of side bending prisms, each having a continuous succession of like vertical flutes with the endmost flute at one side merging sharply into the base of the prism and the opposite endmost flute merging sharply into the base of the neighboring prism.

JOHN L. KOUBEK.